United States Patent [19]

Yokono et al.

[11] Patent Number: 4,773,737
[45] Date of Patent: Sep. 27, 1988

[54] COLOR DISPLAY PANEL

[75] Inventors: Koujiro Yokono, Yokohama; Tetsuya Kaneko; Shinichi Yamashita, both of Atsugi, all of Japan

[73] Assignee: Canon Kabushiki Kaisha, Tokyo, Japan

[21] Appl. No.: 806,374

[22] Filed: Dec. 9, 1985

[30] Foreign Application Priority Data

Dec. 17, 1984 [JP] Japan .................. 59-264389

[51] Int. Cl.$^4$ ............................................. G02F 1/13
[52] U.S. Cl. .............................. 350/339 F; 350/333; 350/334; 350/350 S
[58] Field of Search ............ 350/339 F, 333, 334, 350/337, 350 S; 357/23.7, 2; 340/701, 703, 784, 765

[56] References Cited

U.S. PATENT DOCUMENTS

| | | | |
|---|---|---|---|
| 4,231,640 | 11/1980 | Funada et al. | 350/336 |
| 4,367,924 | 1/1983 | Clark et al. | 350/346 |
| 4,470,667 | 9/1984 | Okubo et al. | 350/339 F |
| 4,593,978 | 6/1986 | Mourey et al. | 350/339 F |
| 4,600,274 | 7/1986 | Morozumi | 350/333 |
| 4,642,619 | 2/1987 | Togashi | 340/703 |

FOREIGN PATENT DOCUMENTS

| | | | |
|---|---|---|---|
| 0097627 | 5/1986 | Japan | 350/339 F |
| 2133912 | 8/1984 | United Kingdom | 350/339 F |

Primary Examiner—Stanley D. Miller
Assistant Examiner—Huy Mai
Attorney, Agent, or Firm—Fitzpatrick, Cella, Harper and Scinto

[57] ABSTRACT

A color display panel comprising a plurality of picture elements arranged in a plurality of rows and a plurality of columns, and a plurality of driving lines disposed substantially along columns of picture elements, each picture element forming a color picture element selected from red picture elements, green picture elements and blue picture elements. Two or three types of color picture elements selected from the red, green and blue picture elements are arranged in a column, and each type of color picture elements among the two or three types of color picture elements arranged in a column are commonly connected to a driving line.

11 Claims, 7 Drawing Sheets

COLOR DISPLAY PANEL

FIELD OF THE INVENTION AND RELATED ART

The present invention relates to a color display panel with picture elements arranged in the form of a matrix. More particularly, the present invention relates to a color display panel provided with an active matrix circuit comprising switching elements arranged at the picture elements.

As a representative color display panel of an active matrix driving type, there has been proposed a color liquid crystal display device using thin film transistors (hereinafter abbreviated as "TFTs") as switching elements.

The color liquid crystal display panel generally comprises a substrate on which TFTs and picture element electrodes arranged in rows and columns are provided, a second substrate on which counter electrodes are disposed, a liquid crystal sandwiched between the substrates, and red (R), green (G) and blue (B) color filters each disposed corresponding to one picture element electrode. One color filter is used to constitute one color picture element selected from red, green and blue picture elements.

Color display is performed by controlling the state of the liquid crystal by a TFT at each of the thus formed color picture element.

Figure 1:
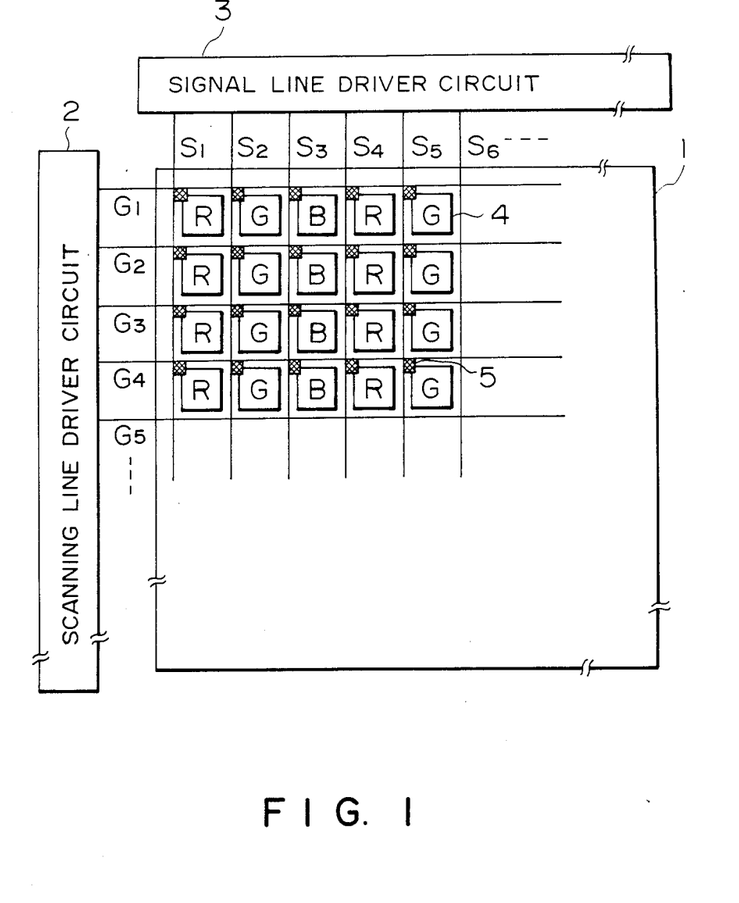
FIG. 1 is a schematic view showing an example of the stripe arrangement used in a conventional color liquid crystal display panel.

FIG. 1 shows an outline of a conventional TFT-driven color liquid crystal display device, wherein a display unit or zone 1 is driven by a scanning line driver circuit 2 and a signal line driver circuit 3.

The display unit 1 comprises a plurality of color picture elements 4 arranged in a matrix, and a color filter R, G or B is disposed at each picture element 4. Scanning lines $G_1, G_2, G_3, \ldots$ connected to the scanning line driver circuit 2 are disposed respectively along a row of picture elements 4 so as to address the picture elements. Signal lines $S_1, S_2, S_3, \ldots$ connected to the signal line driver circuit 3 are disposed respectively along a column of picture elements 4 so as to supplying signals to the picture elements. Along signal lines $S_1, S_2, \ldots$, TFTs 5 as switching elements connected to respective picture elements 4 are disposed regularly along one side of the signal lines.

The display unit 1 is driven by the liquid crystal at respective color picture elements 4 by supplying corresponding color signals to the picture elements through corresponding signal lines and TFTs addressed by scanning lines.

Generally, in this type of color display device, the manner in which color picture elements are arranged is an important factor affecting the performance of the display device. As manners of arrangement of color picture elements, well known are a stripe arrangement and a mosaic arrangement. From the viewpoint of resultant image quality, the stripe arrangement is accompanied with problems that a vertical line is liable to be noticeable and disturbance in edge portion of a linearly inclined image, is emphasized. In contrast mosaic arrangement is generally free of those defects and is therefore superior. On the other hand, in respect of driving performance, the mosaic arrangement requires a complicated circuit formulation, whereas the stripe arrangement advantageously requires only a simple circuit.

The above-mentioned FIG. 1 shows an example wherein a stripe arrangement of color picture elements is adopted. In the device shown in FIG. 1, color signals of R, G and B are respectively allotted to the signal lines $S_1, S_2, S_3, \ldots$ arranged from the left to the right, which allotment order is repeated to distribute the color signals to the signal lines. Thus, the R, G and B picture elements are respectively aligned vertically along the respective signal lines and laterally in a cycle of 3 columns each, thereby to effect color display according to the stripe arrangement.

Figure 2:
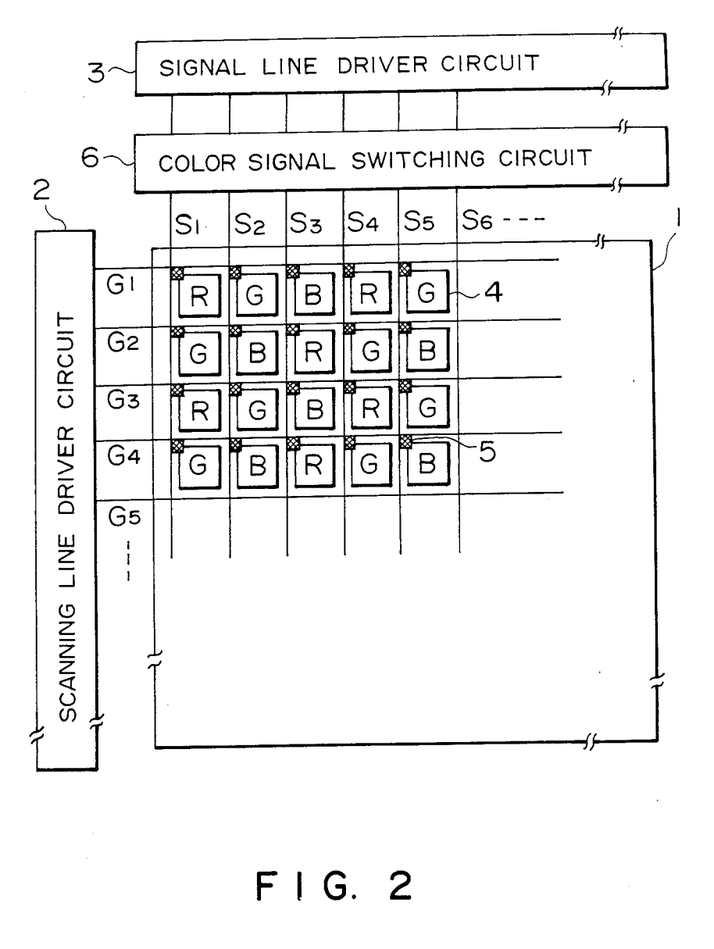
FIG. 2 is a schematic view showing an example of the mosaic arrangement used in a conventional color liquid crystal display panel.

On the other hand, FIG. 2 shows an example of the mosaic arrangement. As previously discussed, according to the stripe arrangement shown in FIG. 1, a color signal allotted to a signal line is fixedly supplied to the signal line, whereas according to the mosaic arrangement, with respect to each signal line, any one of color signals R, G and B corresponding to respective color picture elements is selected for each scanning line.

In the example of FIG. 2, color signals are allotted to the signal line $S_1$ in the order of R, G, R, G, $\ldots$; to $S_2$, the order of G, B, G, B, $\ldots$; and to $S_3$, the order of B, R, B, R, $\ldots$, for each scanning cycle. For this purpose, a color signal switching circuit 6 is required to effect high speed switching in synchronism with the signals from the signal line driver circuit. The addition of the switching circuit 6 complicates the whole driving circuit system with respect to circuit space, increase in ICs required, provides increasing production cost, etc., and is therefore undesirable.

As is understood from the above examples, the conventional devices involve several problems, i.e., the poor image quality with respect to the stripe arrangement (which requires only a simple driving circuit system), or the complicated driving circuit system with respect to the mosaic arrangement which provides a better image quality.

SUMMARY OF THE INVENTION

A principal object of the present invention is, in view of the problems involved in the prior art as described above, to provide a color display panel capable of realizing a mosaic arrangement which provides the desirable high image quality, even while using a simple driving circuit system.

More specifically, according to the present invention, there is provided a color display panel comprising a plurality of picture elements arranged in a plurality of rows and a plurality of columns, and a plurality of driving lines disposed generally along the columns of picture elements, wherein each picture element forming a color picture element selected from red, green and blue picture elements, such that two or three types of color picture elements selected from the red, green and blue picture elements are arranged in a column, and each type of color picture elements among the two or three types of color picture elements arranged in a column are commonly connected to a driving line.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

In general, according to the present invention, the switching elements are disposed along each signal line alternately on the left and right sides. Therefore, while a fixed color signal is allotted to one signal line as in the stripe arrangement, a particular color signal is allotted alternately to the left and right color picture elements as in the mosaic arrangement. In this manner, red, green and blue color signals are distributed to corresponding color picture elements, each alternately disposed on the left and right sides of a signal line. A combination of one red picture element, one green color picture element and one blue color picture element constitute one full color picture element for display.

Figure 3A:
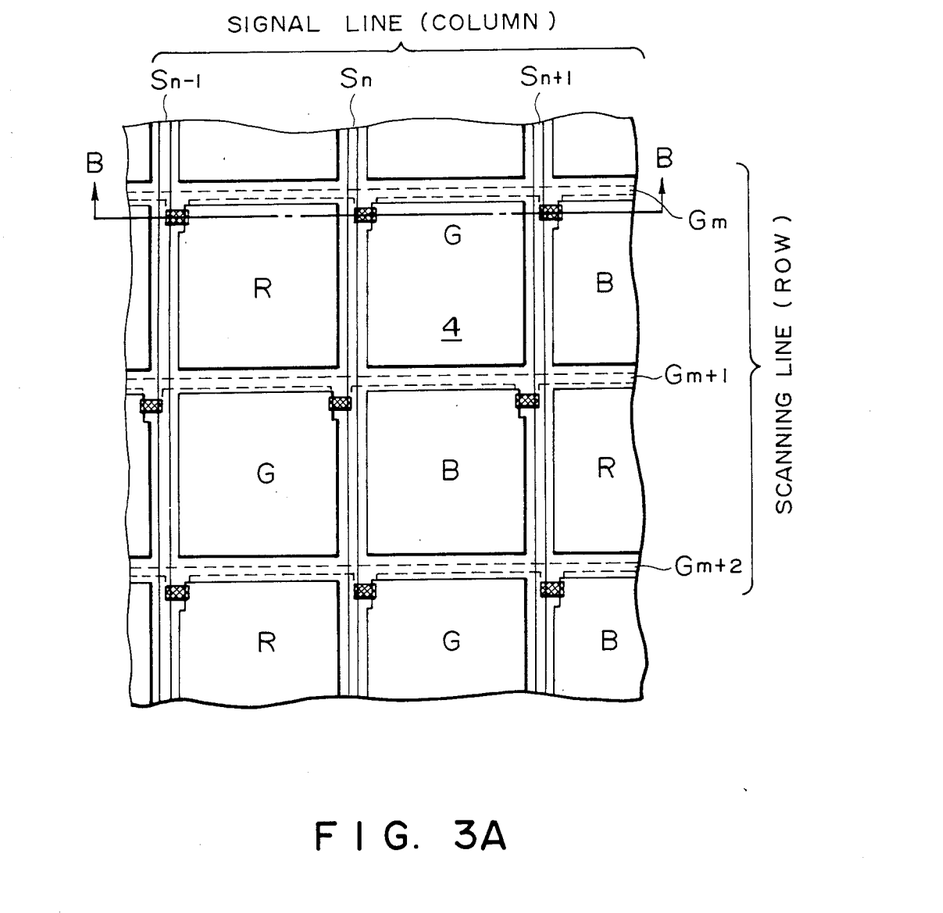
FIG. 3A is a schematic plan view showing an arrangement of TFTs and color picture elements according to the present invention.

FIG. 3A is a schematic plan view showing an arrangement of TFTs and color picture elements according to the present invention. As shown in FIG. 3A, according to the present invention, switching elements 5 (e.g., TFT) are disposed at respective intersections of vertically extending source signal lines ($S_{n-1}$, $S_n$, $S_{n+1}$, . . . ) and laterally extending gate scanning lines ($G_m$, $G_{m+1}$, $G_{m+2}$, . . . ) mutually crossing at right angles, and the switching elements 5 are disposed so as to alternate on the left and right sides of each signal line. In other words, along a single signal line, switching elements 5 are disposed so as to alternately contact left and right color picture elements, i.e., every other color picture element on the left or right side of the signal line. The signal or driving lines are disposed at a substantially equal pitch as shown in FIG. 3A.

Figure 3B:
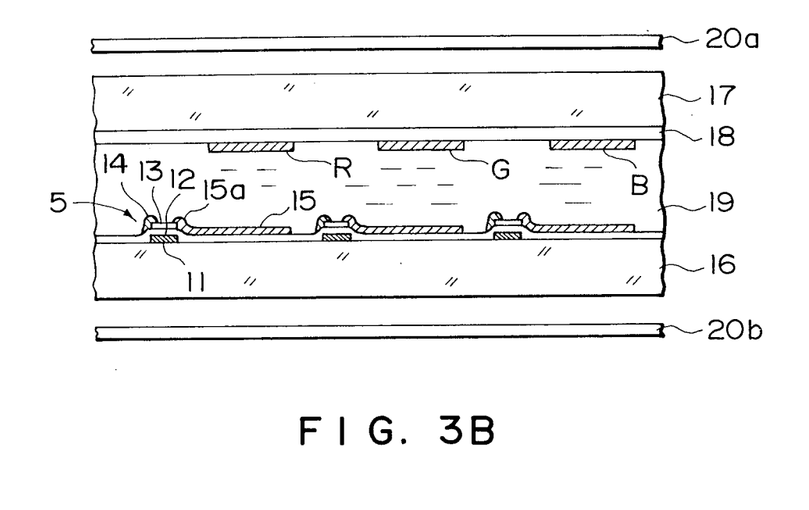
FIG. 3B is a sectional view of a color liquid crystal display panel according to the invention corresponding to one taken along line B—B in FIG. 3A.

FIG. 3B shows a specific sectional view of an example of the color display panel according to the present invention, corresponding to one taken along the line B—B in FIG. 3A. The color display panel shown in FIG. 3B comprises a pair of substrates 16 and 17. On one substrate 16 are disposed TFTs 5, each comprising a gate electrode 11, a gate insulating film 12, a semiconductor film 13 (which may be amorphous), a source electrode 14 and a drain electrode 15a connected to a picture element electrode 15. The opposite substrate 17 is provided with a counter electrode 18 and a layer of color filters R, G and B at positions corresponding to the picture element electrodes 15. A twisted nematic liquid crystal 19 is disposed between the substrates 16 and 17, outside of which are further disposed a pair of polarizers 20a and 20b for detecting optical modulation by the device.

Figure 4:
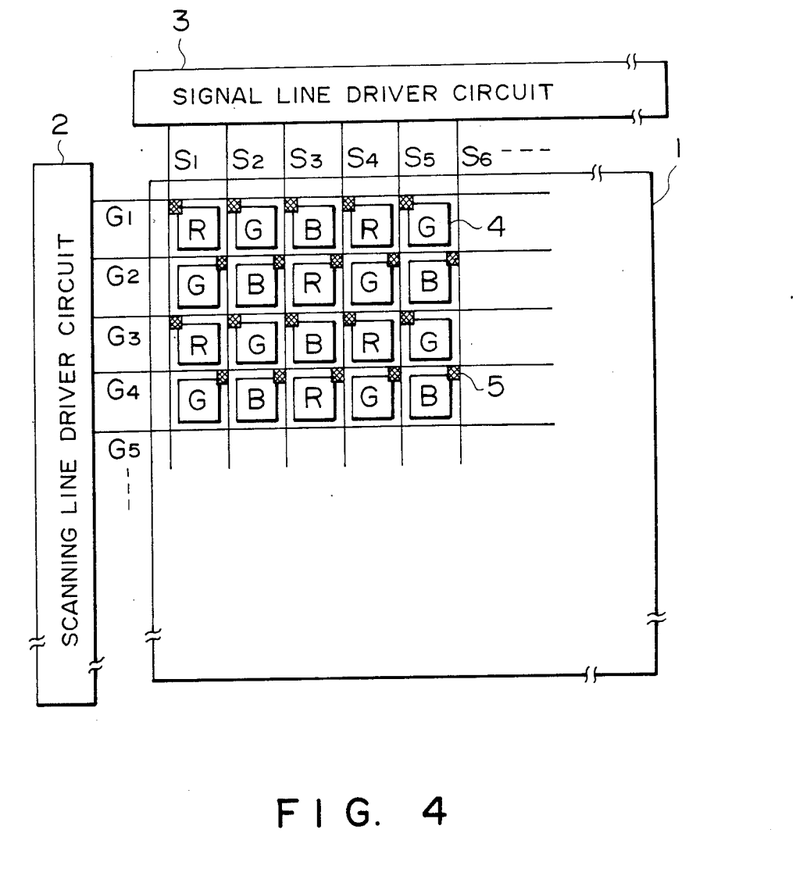
FIG. 4 is a schematic plan view showing a first embodiment of the display panel according to the present invention.

FIG. 4 shows a whole arrangement of an embodiment of the color display panel according to the present invention in a simplified and schematic manner. As will be understood from FIG. 4, while the arrangement of the color picture element is substantially the same as the conventional mosaic arrangement, TFTs 5 are disposed alternately on the left and right sides of each of signal lines $S_1$-$S_6$ . . . and more strictly, every other scanning line on a signal line $S_1$ and on the rightmost signal line among them, whereby a color signal switching circuit 6 as shown in FIG. 2 in unnecessitated.

Figure 5:
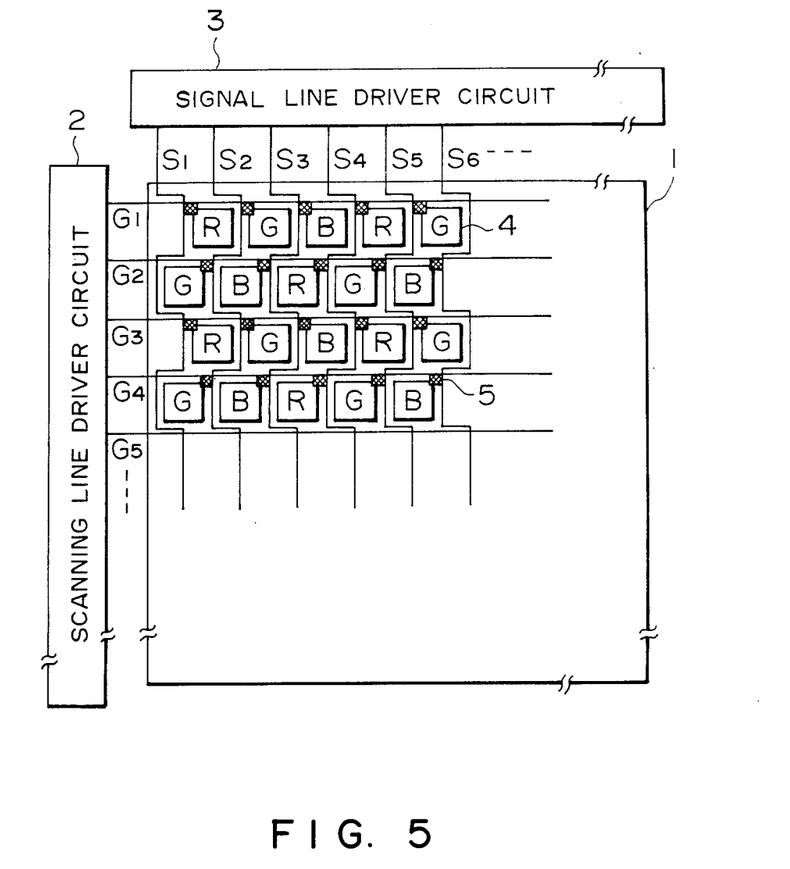
FIG. 5 is a schematic plan view showing a second embodiment according to the present invention.

FIG. 5 shows a second embodiment of the color display panel according to the present invention. Referring to FIG. 5, in this embodiment, color picture elements 4 are arranged in a matrix of rows and staggered columns. More specifically, the picture elements 4 are arranged in the order of R, G, R, G, . . . ; G, B, G, B, . . . ; or B, R, B, R, . . . , for a staggered column. Corresponding to the staggered arrangement of columns, signal lines $S_1$-$S_6$ . . . are disposed along boarders between color picture elements, i.e., displaced by a span of a half width of one color picture element for each vertical length of one color picture element along each column.

According to this staggered arrangement, the arrangement of each unit color picture element is further uniformized and the periodic structure of color arrangement is even less noticeable, whereby a further improvement in image quality can be accomplished.

The present invention may also be applicable to the type of ferroelectric liquid crystal devices as proposed by Clark et al (U.S. Pat. No. 4,367,924). The ferroelectric liquid crystal device does not necessarily require TFTs and can be operated according to a passive-matrix driving scheme. Thus, the present invention is also applicable to such a ferroelectric liquid crystal device or another liquid crystal device of a passive matrix driving-type, so that the advantages of good image quality and a simple driving system can also be attained.

Figure 6:
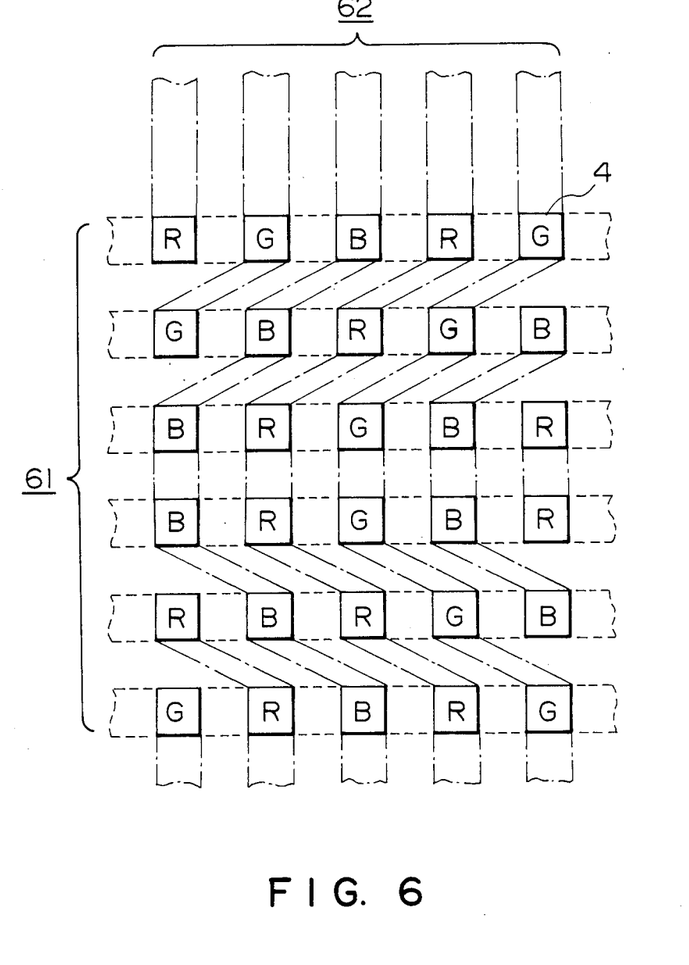
FIG. 6 is a schematic partial plan view of a third embodiment of the present invention.

FIG. 6 shows a schematic partial plan view of such a color display panel using a passive matrix type driving system. The color display panel of FIG. 6 is also an embodiment wherein three types R, G and B of color picture elements are arranged in a column. More specifically, the display panel of FIG. 6 comprises rows of scanning electrodes 61, on each of which three types R, G and B of color picture elements are arranged in the order named and columns of staggered signal electrodes 62 on each of which one type of color picture elements are arranged, whereby the three types of color picture elements are arranged in a linear column. In the display panel of FIG. 6, dot matrix electrodes are adopted and accordingly a twisted nematic liquid crystal or a ferroelectric liquid crystal is disposed between the scanning electrodes 61 and signal electrodes 62, which respectively serve as scanning lines and signal lines, according to the present invention.

As will be understood from the embodiments of FIG. 5 and, the color picture elements or the signal lines need not be arranged in strictly vertical columns but may be arranged in a staggered fashion or in a somewhat step-like arrangement, provided that they can be generally be aligned along each other. In other words, columns of picture elements and signal lines can cross each other provided that one type of color picture elements in a column can be commonly connected separately from the other types of color picture elements to a signal line without imparing the display performance and without substantial difficulty.

As has been described with reference to embodiments, according to the present invention, the arrangement of color picture elements can be easily changed by changing only layout or arrangement of switching elements such as TFTs and signal lines and without modifying a driving circuit system.

Especially, as color display in accordance with the mosaic arrangement can be realized with the use of a simple driving circuit for the stripe arrangement as it is and without providing a color signal switching circuit, the image quality can be improved without requiring any increase in production cost.

What is claimed is:

1. A color display panel, comprising: a plurality of color picture elements arranged in a plurality of rows and a plurality of columns having a plurality of driving lines disposed only along the sides of said columns of color picture elements, wherein each color picture element is selected from the group consisting of red, green and blue picture elements, such that at least two of said color picture elements are arranged within a single column, and each of said color picture elements of each color arranged within said column are commonly connected to a single driving line independently from the other color picture elements.

2. The color display panel according to claim 1, wherein said columns of color picture elements are arranged in a staggered fashion.

3. The color display panel according to claim 1, wherein said driving lines are signal lines and a plurality of scanning lines are disposed along the rows of color picture elements so as to drive the picture elements in cooperation with the signal lines.

4. The color display panel according to claim 1, wherein each color picture element is provided with a semiconductor switching element and connected to the driving line through the semiconductor switching element.

5. The color display panel according to claim 4, wherein said semiconductor switching element is a thin film transistor.

6. The color display panel according to claim 5, wherein said thin film transistor comprises an amorphous semiconductor film.

7. The color display panel according to claim 1, wherein said color picture element comprises a pair of oppositely spaced electrodes, a liquid crystal disposed between the oppositely spaced electrodes, and a layer of color filters.

8. The color display panel according to claim 7, wherein said liquid crystal is a twisted nematic type liquid crystal.

9. The color display panel according to claim 7, wherein said liquid crystal is a ferroelectric liquid crystal.

10. The color display panel according to claim 7, wherein said layer of color filters is disposed between the oppositely spaced electrodes.

11. The color display panel according to claim 1, wherein the driving lines disposed along the columns of color picture elements are disposed at a substantially equal pitch.

* * * * *